United States Patent
Pezzaniti

(10) Patent No.: US 7,070,278 B2
(45) Date of Patent: Jul. 4, 2006

(54) AUTOSTEREOSCOPIC 3-D DISPLAY

(75) Inventor: Joseph Larry Pezzaniti, Harvest, AL (US)

(73) Assignee: Mems Optical, Inc., Huntsville, AL (US)

( * ) Notice: Subject to any disclaimer, the term of this patent is extended or adjusted under 35 U.S.C. 154(b) by 0 days.

(21) Appl. No.: 10/787,973

(22) Filed: Feb. 27, 2004

(65) Prior Publication Data

US 2005/0046799 A1 Mar. 3, 2005

Related U.S. Application Data

(63) Continuation-in-part of application No. 10/766,240, filed on Jan. 29, 2004, now Pat. No. 6,974,216.

(60) Provisional application No. 60/443,184, filed on Jan. 29, 2003.

(51) Int. Cl.
*G03B 21/14* (2006.01)
*G02B 27/22* (2006.01)

(52) U.S. Cl. .................. 353/7; 359/619; 359/462

(58) Field of Classification Search ............ 353/7, 353/10, 38; 359/458, 462, 463, 464, 466, 359/478, 619; 348/759, 756, 750
See application file for complete search history.

(56) References Cited

U.S. PATENT DOCUMENTS

| | | | |
|---|---|---|---|
| 5,005,968 A * | 4/1991 | Tejima et al. | 353/122 |
| 5,250,967 A * | 10/1993 | Miyashita | 353/38 |
| 5,971,546 A * | 10/1999 | Park | 353/38 |
| 6,064,424 A | 5/2000 | Berkel et al. | |
| 6,118,584 A * | 9/2000 | Van Berkel et al. | 359/463 |
| 6,445,406 B1 | 9/2002 | Taniguchi et al. | |
| 6,462,871 B1 | 10/2002 | Morishima | |
| 6,825,985 B1 * | 11/2004 | Brown et al. | 359/619 |
| 2003/0016444 A1 | 1/2003 | Brown et al. | |

\* cited by examiner

*Primary Examiner*—William C. Dowling
(74) *Attorney, Agent, or Firm*—McGrath, Geissler, Olds & Richardson, PLLC

(57) ABSTRACT

A lenslet array having variously shaped and sized lenslets, where the lenslets are rotated and/or tilted, reducing gap images in an image formed by pixels/subpixels, where the pixel/subpixels have gaps between each other forming the gap images.

18 Claims, 7 Drawing Sheets

AUTOSTEREOSCOPIC 3-D DISPLAY

CROSS REFERENCE TO RELATED APPLICATIONS

This application is a continuation in part of the U.S. patent application Ser. No. 10/766,240 filed 29 Jan. 2004, now U.S. Pat. No. 6,974,216, "Autostereoscopic 3-D Display" by Joseph Larry Pezzaniti, the entire contents of which are hereby incorporated by reference and for which priority is claimed under 35 U.S.C. § 120, and this application claims priority under 35 U.S.C. § 119 to Provisional Application No. 60/443,184 filed on 29 Jan. 2003, "Autostereoscopic 3-D Display using Lenses to Minimize Gap Images", the entire contents of which are hereby incorporated by reference.

FIELD OF THE INVENTION

The present invention relates to Autostereoscopic 3-D display devices and methods.

BACKGROUND OF THE INVENTION

A three-dimensional display of images can be created by a stereoscopic display. A stereoscopic display provides multidimensional image cues to a viewer by combining two alternative two-dimensional views of the same object or scene. Each view is observed by one of the viewer's eyes and the two views are subsequently integrated by the human visual system to form a three-dimensional image perceived by the viewer. An Autostereoscopic display is a form of stereoscopic display that requires no head-mounted equipment (e.g. red-green glasses).

Additional, related art autostereoscopic displays position lenses in alignment with display picture elements, such that interlaced left and right eye images are directed at fixed angles, which do not necessarily represent a viewer's actual left and right eye viewing zones. Because the lenses are aligned with pixels, interference pattern noise or moiré patterns result from spatial mismatches between pixel edges and cylindrical lens edges when viewed off-axis. In addition the alignment results in projection of images outside the viewer's proper left and right eye viewing zones.

Related art methods of solving some of these problems with color pixels results in the display being rotated ninety degrees. Color displays are normally constructed with pixels each comprising a plurality of color elements (e.g. red, green, blue) arranged alongside each other along a generally horizontal line of the display as oriented in its position of intended use. Related art solutions have displays that have the red, blue and green pixels vertically aligned (display rotated ninety degrees). Such methods require modifications to the driving convention of the display and limit the ability to convert conventional displays to provide stereoscopic images. Additionally, color pixels have gaps between them resulting in gaps in the image. Thus, when a viewer moves his/her head the gaps are viewed as black lines.

SUMMARY OF THE INVENTION

Exemplary embodiments of the invention provide devices and methods for autostereoscopic display using conventional or designed pixel arrays.

Exemplary embodiments provide various shaped, and sized, lenslets in a lenticular array, where the lenslets may be concave, convex, symmetric, asymmetric, or a combination of shapes.

Exemplary embodiments provide a master or secondary mold of lenticular arrays, using the mold to stamp or mold an optical substance forming the new lenticular arrays producing new lenticular arrays.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limited the scope of the invention.

BRIEF DESCRIPTION OF THE DRAWINGS

Embodiments of present invention will become more fully understood from the detailed description and the accompanying drawings, wherein.

DETAILED DESCRIPTION OF EXEMPLARY EMBODIMENTS OF THE INVENTION

The following description of exemplary embodiment(s) is merely illustrative in nature and is in no way intended to limit the invention, its application, or uses.

Figure 1:
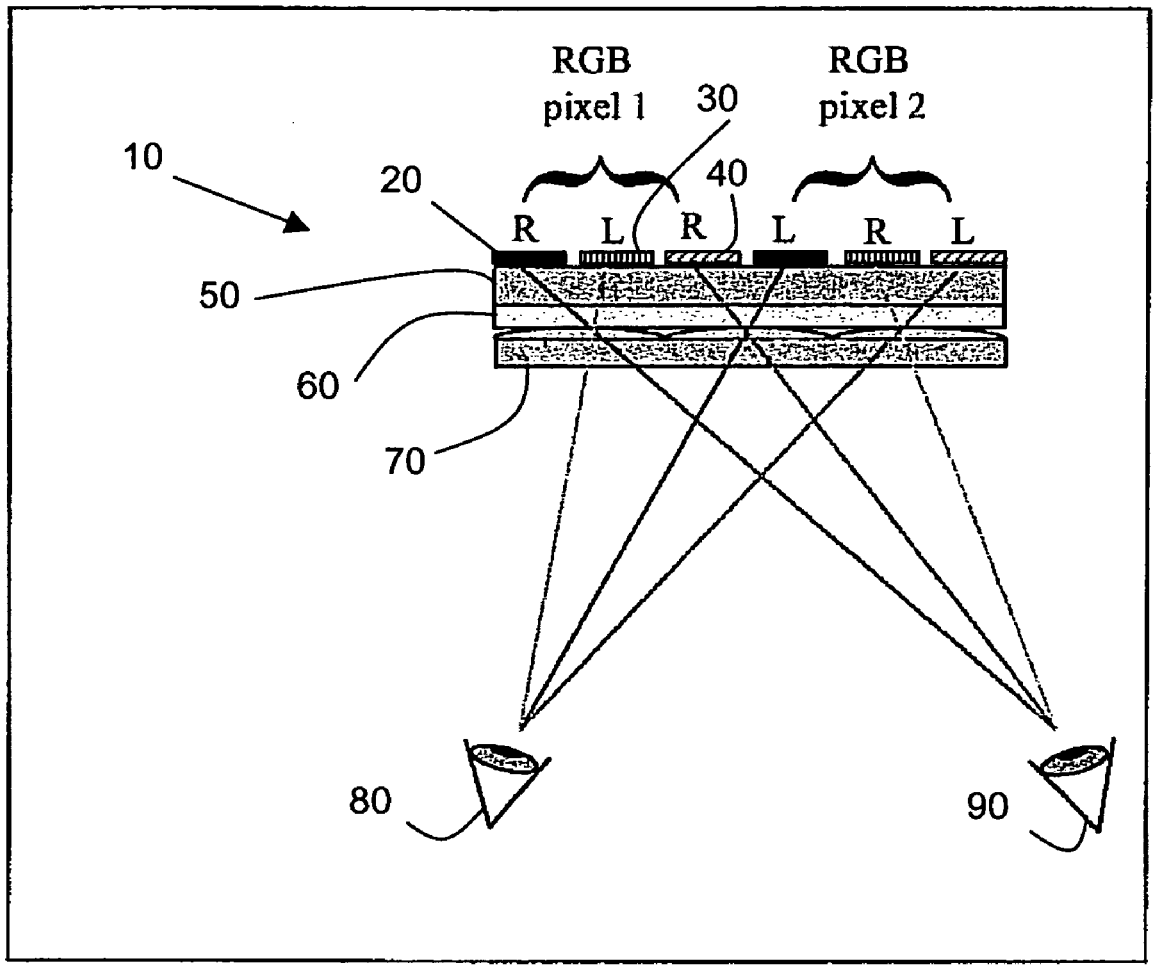
FIG. 1 illustrates a basic design for a 3D display in accordance with at least one exemplary embodiment.

FIG. 1 illustrates an autostereoscopic display 10 as discussed in co-pending. United States patent application filed 29 Jan. 2004, "Autostereoscopic 3-D Display" by Joseph Larry Pezzaniti, the contents of which are incorporated by reference in its entirety.

A single row of pixels is shown, pixel 1 and pixel 2. Each pixel is composed of subpixels 20, 30, and 40. For example subpixel 20 can be a red subpixel, subpixel 30 a green subpixel, and subpixel 40 a blue subpixel. Other combinations and numbers of subpixels can compose a pixel and the discussion herein should not be interpreted to limit the number of subpixels in a pixel to three nor the colors to only red, green, and blue. A combination of subpixels in either pixel 1 or pixel 2 combine to form a right eye view 90 and a left eye view 80. The subpixels corresponding to the right eye view are designated "R" and for the left eye view "L." In the embodiment shown the right eye view 90 receives light from red subpixel 20 and blue subpixel 40 in pixel 1 and a green subpixel from pixel 2. Likewise the left eye view 80 receives light from green subpixel 30 from pixel 1 and from red and blue subpixels from pixel 2. The left eye view 80 and the right eye view 90 are formed by light from the subpixels interlaced by cylindrical lenslets in a lenticular array 70. In the embodiment shown a LCD cover glass 50 covers pixels 1 and 2, and is separated by the lenslet array 70 by a plastic layer 60. In other embodiments various types of materials can be used and the plastic layer need not be used. For example, the lenslets can be of various shapes and sizes and made of various materials such as glass, silicon, and other like material.

The light from the subpixels is collimated by the lenslets. The light impinges on pupils of eyes at the left eye view 80 position and the right eye view 90 position, creating left and right stereo images. A viewing system, for example an imaging device (e.g. optical detector, camera, additional optical systems, and the like) or biological entity (e.g. person, human, animal, and the like) can be placed to intercept the images at the left eye view 80 and the right eye view 90. The subpixels are spaced apart and thus have gaps. There can be light from the gaps or no light, which forms gap images that are combined with the stereo images. The gap images typically look like black lines when a viewing system is swept across the right eye and left eye views, 90 and 80 respectively.

The lenticular array 70 can be linearly arranged, as shown, or arranged in a curved fashion depending on the needed use. The lenslets can be cylindrical lenses or of various shapes depending upon the intended viewing positions and the arrangement of the lenslet array 70. The color subpixels can be spread in the same direction of the separation of the left and right views.

The pixels 1 and 2 are grouped with other pixels to form a pixel array. The pixel array can form a 2-D image. The lenslet array 70 placed between the pixel array and the left and right eye views 80 and 90 can create a 2-D image. The lenslet arrays can also enable the formation of a 3-D image. Thus the at least one embodiment shown in FIG. 1 can display both 2-D and 3-D images. Thus in accordance with at least one embodiment a 3-D display is realized with a flat-screen or curved-screen color display and a lenticular array arranged in a flat plane or a curved plane in accordance with at least one exemplary embodiment of the invention.

Pixel arrays in accordance with exemplary embodiments can be arranged in vertical or horizontal sub pixel arrangement. Likewise the pixel arrays can contain pixels that have a number of subpixels.

Figure 2:
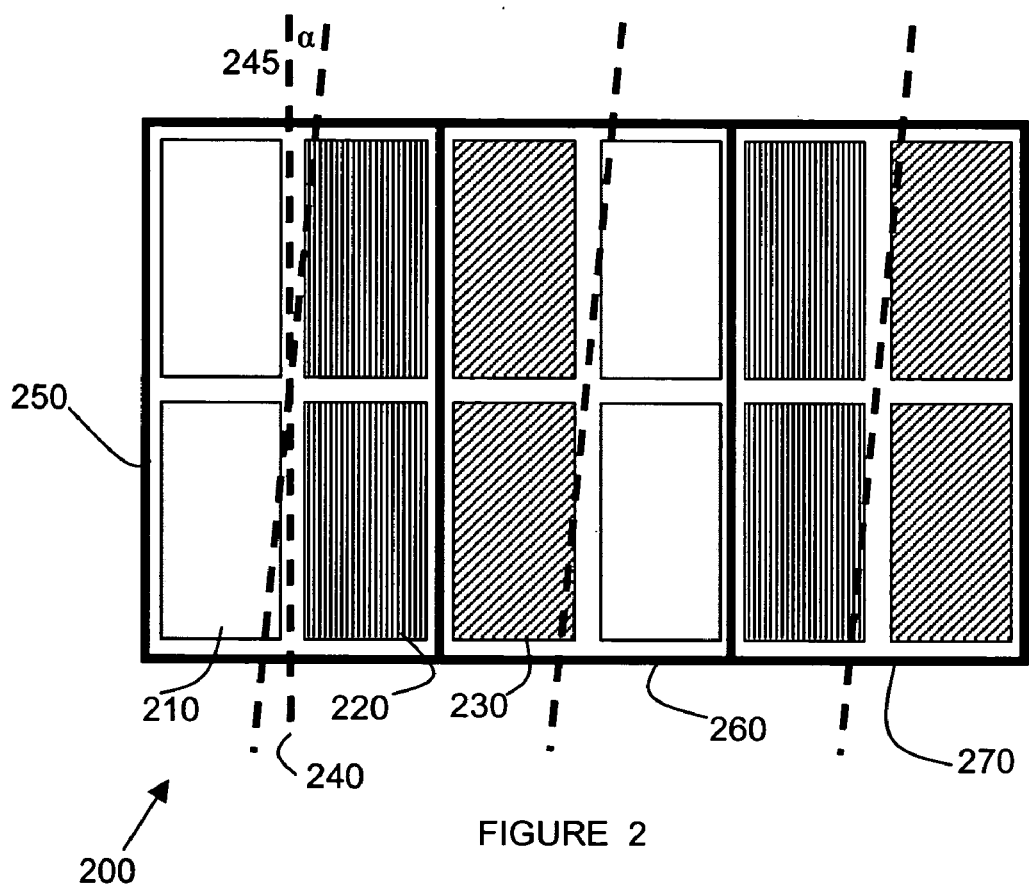
FIG. 2 illustrates an arrangement of lenslets and three color pixels (in gray scale) in accordance with at least one exemplary embodiment.

FIG. 2 illustrates an arrangement of lenslets 200 in accordance with at least one exemplary embodiment. FIG. 2 shows a two by two array of pixels overlaid with three cylindrical lenses 250, 260, and 270 in two rows. The lenslets 250, 260, and 270 can repeat every two rows of pixels across the larger array. The lenslet 250 has a first and second axis, where the first axis 240 is parallel to a line corresponding to a center of curvature of a face of the lenslet, and the second axis 245 bisects a projection of the lenslet, where vectors corresponding to each axis intersect at a first angle θ. The first axis 240 of the lenslets is rotated by a chosen angle α, which is a projection of the first angle θ. The pixel is composed of three color subpixels 210, 220, and 230. The rotation causes the top row of subpixels to form images to the right of the images formed by the bottom row of subpixels. Thus, the image of the pixel, which is the image composed of the combination of a particular set of subpixels, is blurred and somewhat rotated. The blurred pixel image combined with other blurred pixel images reduces the gap images. Blurring of the pixel images too much results in significant cross-talk between views. If the pixel images are blurred too extensively, i.e. making the diffuse image of the pixel too large, then a fraction of the light from the left eye view can be observed in the right eye view. Varying the shape, size, tilt, radius of curvature, and rotation of the lenslets allow a controlled blurring of the pixel images to minimize the amount of cross talk between views, while reducing the gap images. Such variation allows the reduction of black line images in the right eye and left eye views while maintaining a sufficiently sharp image.

Figure 3:
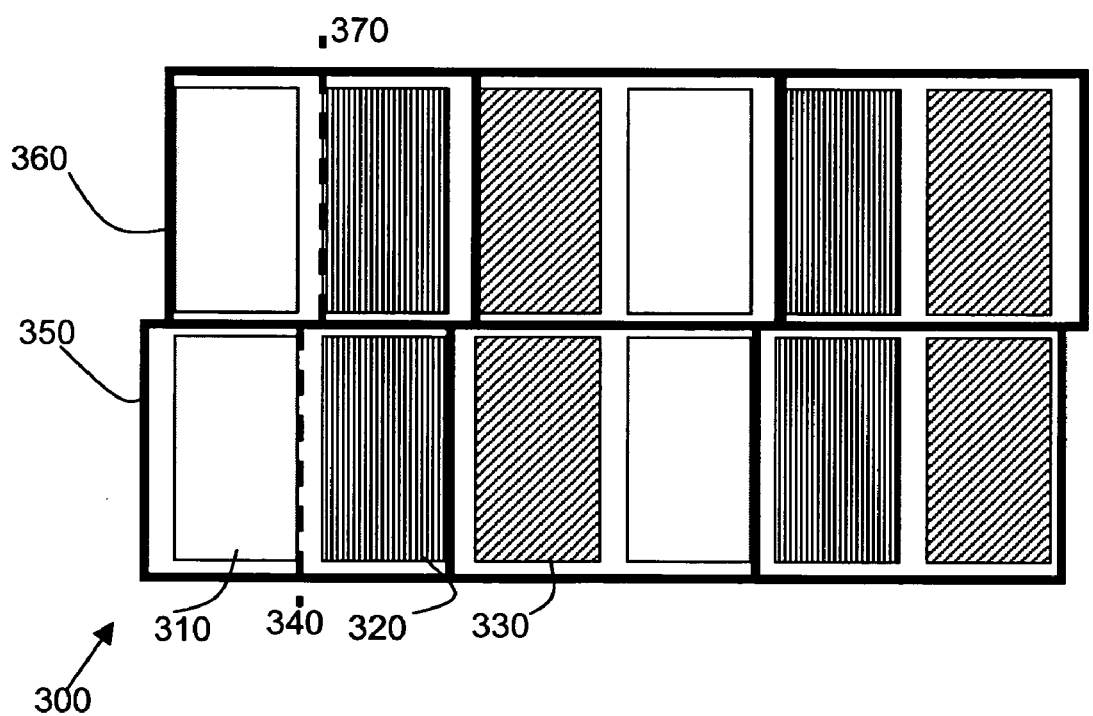
FIG. 3 illustrates a further arrangement of lenslets and three color pixels (in gray scale) in accordance with at least one exemplary embodiment.

FIG. 3 illustrates an arrangement of lenslets 300 in accordance with at least one exemplary embodiment. FIG. 3 shows a two by two array of pixels overlaid with six cylindrical lenslets similar to lenslets 350 and 360 in two rows. The lenslets 350 and 360 can repeat every two subpixel across the entire array. The lenslet 360 has a first lenslet first axis 370 that is parallel to a line corresponding to a center of curvature of a face of the lenslet 360, and a second lenslet 350 having a second lenslet first axis 340 that is parallel to a line corresponding to a center of curvature of a face of the lenslet 350. In the exemplary embodiment shown the first lenslet first axis 370 and the second lenslet first axis 340 are offset. The offset of the lenslets 350 and 360 result in a similar blurring of the pixel images as discussed above. By varying the offset distance, the pixel images are offset and blurred reducing the images of the gaps. In exemplary embodiments a single offset can be used between alternative rows or "n" offsets can be used between "n" rows.

Figure 4:
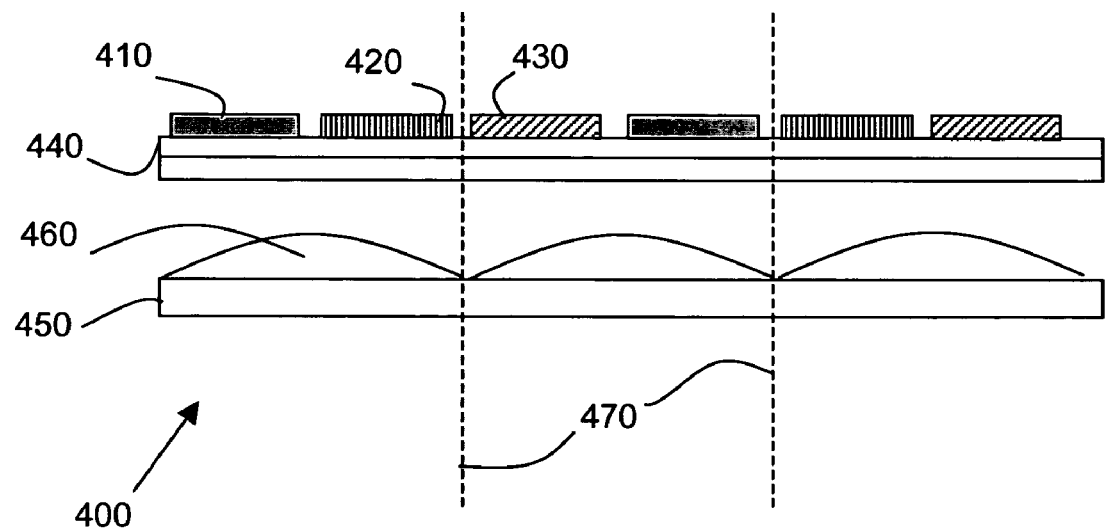
FIG. 4 illustrates a cross section of a lenticular array having the extent of the lenslets covering two subpixels in accordance with at least one exemplary embodiment.

FIG. 4 illustrates a lenticular array 450 in accordance with an exemplary embodiment. A display 400 contains of a pixel array 440 with the lenticular array 450 placed before the pixel array 440. The pixel array 440 is composed of an array of pixels having subpixels 410, 420, and 430. The subpixels can be of various colors and can vary in number. For example a pixel can be composed of subpixels 410, 420, and 430 or a pixel can be composed of fewer or greater number of subpixels. The lenslets 460 have an extent characterized by the edge lines 470. In the embodiment shown the lenslet extent covers two subpixels. Although the lenslets are shown having a concave shape toward the pixel array and a flat back, exemplary embodiments are not limited to such shapes. Either side of the lenslet can be of various shapes. Additionally the extent of the lenslets can cover more than or less than two subpixels.

Figure 5:
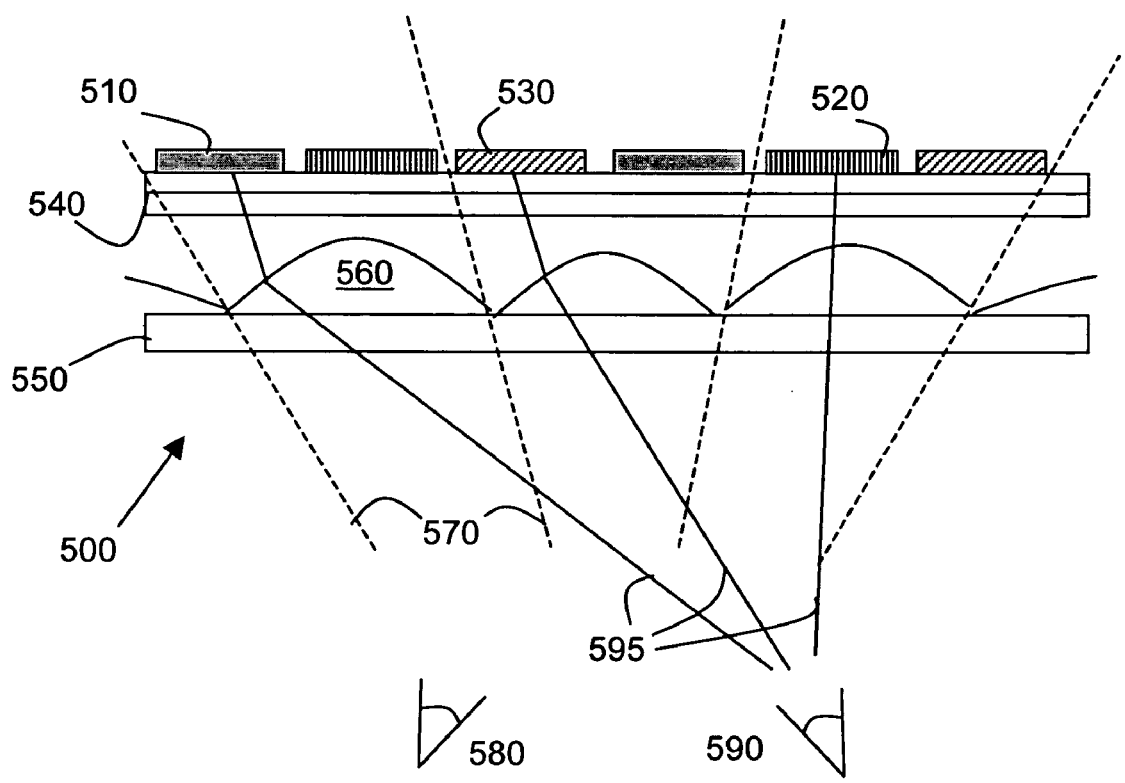
FIG. 5 illustrates a cross section of a lenticular array having variably sized concave lenslets in accordance with at least one exemplary embodiment.
Figure 7:
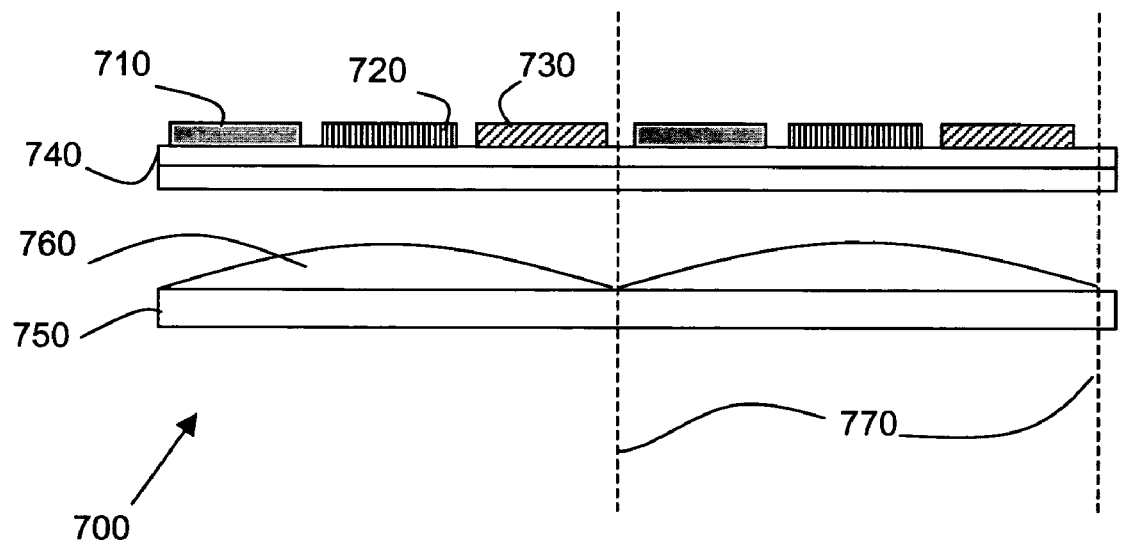
FIG. 7 illustrates a cross section of a lenticular array in accordance with at least one exemplary embodiment.

FIG. 5 illustrates a display 500 in accordance with at least one exemplary embodiment. In the exemplary embodiment shown, a pixel array 540, composed of pixels having subpixels 510, 520, and 530 where the subpixels can be of various color, is placed next to a lenticular array 550. The lenticular array 550 is composed of lenslets 560 having extents bordered by imaginary extent lines 570. The extent lines 570 are no longer parallel in the exemplary embodiment shown. Additionally the lenslets 560 on the lenticular array 550 can have various shapes and sizes. Light 595 from subpixels 510, 520, and 530 form a pixel image at a right eye view location 590. Likewise other subpixels form a pixel image at a left eye view location 580. Although the imaginary extent lines 570 are shown to be associated with two subpixels, exemplary embodiments can have extent lines associated with more or less than two subpixels. For example FIG. 7 illustrates a display 700, having a lenticular array 750 placed before a pixel array 740, having subpixels 710, 720, and 730. The lenslet 760 is defined by extent lines 770 and covers three subpixels.

Figure 6:
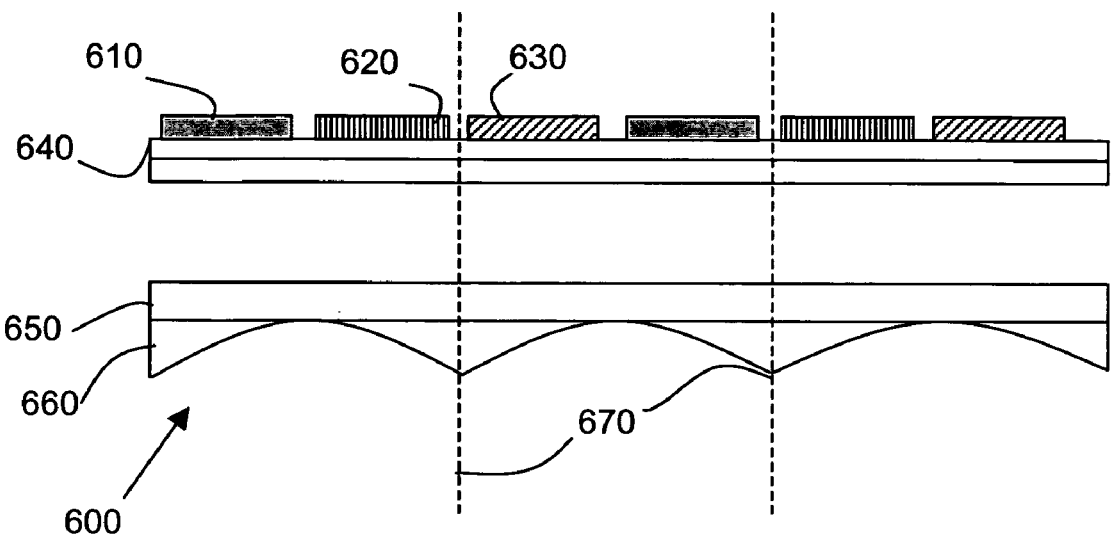
FIG. 6 illustrates a cross section of a lenticular array having convex lenslets in accordance with at least one exemplary embodiment.

FIG. 6 illustrates a display containing a lenticular array in accordance with at least one exemplary embodiment. Some exemplary embodiments have shown concave lenslets pointing toward pixel array 640, made of subpixels 610, 620, and 630, however lenslets in accordance with further exemplary embodiments can have convex shapes 660 as shown in FIG. 6. The convex lenslets 660 on lenticular array 650 are shown with extent lines 670 that span two subpixels. Although the extent covers two subpixels the extent can cover any number or portions of subpixels. Additionally the convex shape can be asymmetric and on either side of the lenticular array 650.

Figure 8:
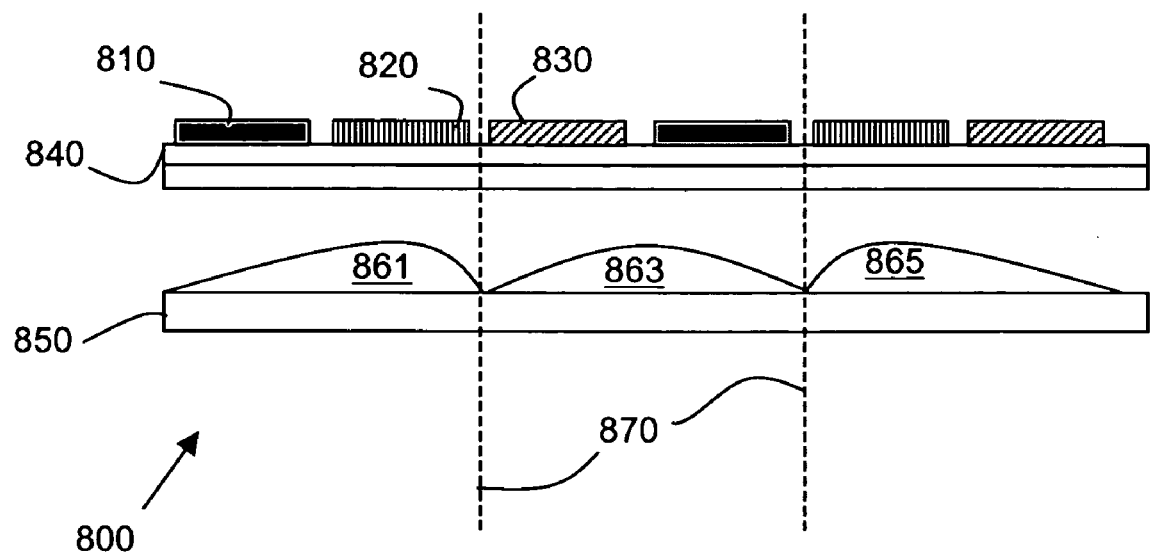
FIG. 8 illustrates a cross section of a lenticular array with lenslets having independent shape and size in accordance with at least one exemplary embodiment.

As discussed above, lenslets in accordance with at least one exemplary embodiment can have various independent shapes. FIG. 8 illustrates a display 800, having a lenticular array 850 and pixel array 840. The pixel array 840 has pixels composed of subpixels 810, 820, and 830. Although three subpixels are shown, pixels in accordance with exemplary embodiments can have any number of subpixels. The lenslets 861, 863, and 865 are shown having independent shapes and sizes. Each lenslet is shown having an extent shown by extent lines 870. Although the extent lines 870 cover two subpixels, the extent and sizes of the lenslets are not limited to two subpixels. Additional exemplary embodiments can have extents covering less or more than two subpixels, or each lenslet can cover only portions of subpixels.

Figure 9:
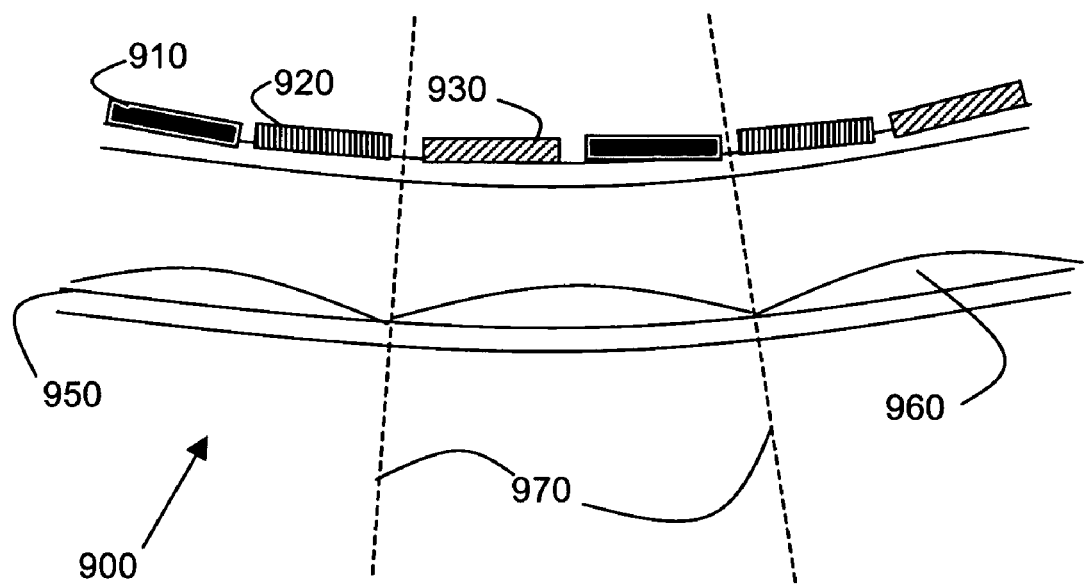
FIG. 9 illustrates a cross section of a lenticular array having lenslets lying on a concave plane in accordance with at least one exemplary embodiment.

Additionally, lenticular arrays in accordance with exemplary embodiments can have a curved planar base structure. For example FIG. 9 illustrates a display 900, having convex (curved shape away from the pixel array) planar base structure, which can be defined by a plane, which intersects the centers of the lenslets 960, or the intersection of an axis of the lenslets that intersect the center of curvature of a face of the lenslets. The pixel array has three subpixels 910, 920, and 930, but can have any number of subpixels. Although a symmetric convex planar base is shown, the planar base can be of any curvilinear shape and can be different for different cross sections (e.g. a concave planar base structure, a curved shape toward the pixel array).

Figure 10A:
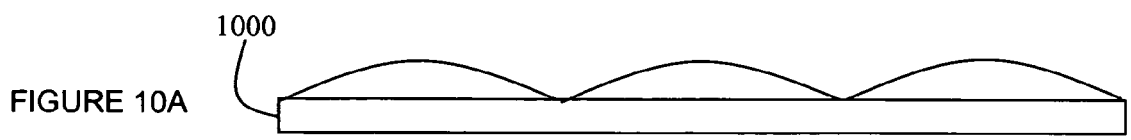
FIGS. 10A–10D illustrate a formed lenticular array being used as a device to form a master mold, with the master mold then used to mold an optical substance forming a new lenticular array in accordance with exemplary embodiments.
Figure 10B:
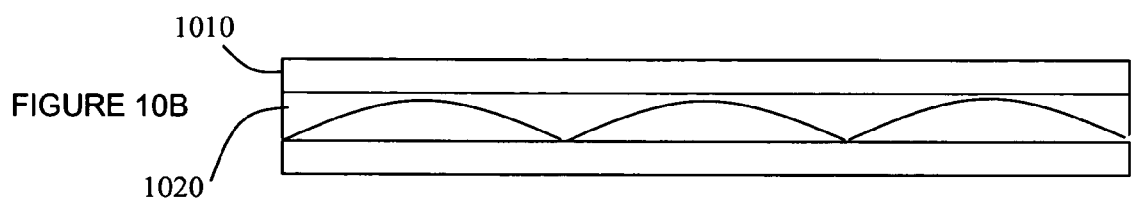
Figure 10C:
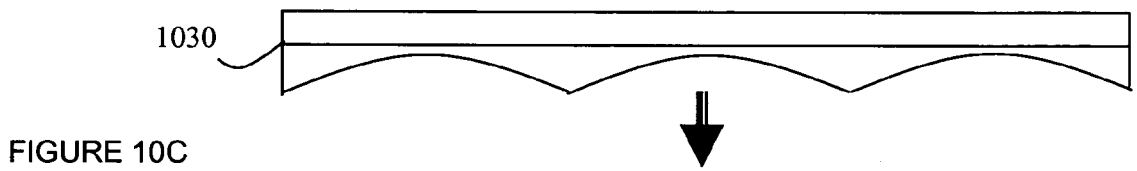
Figure 10D:
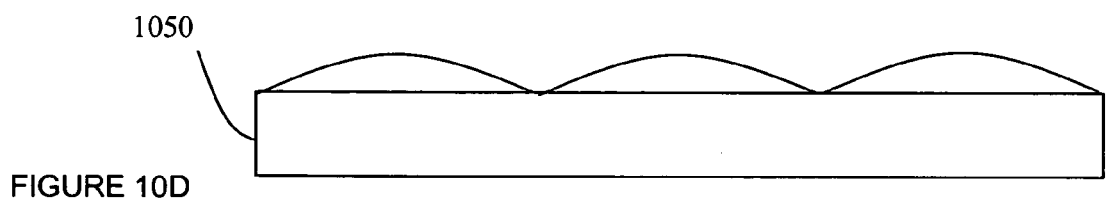
Figure 11A:
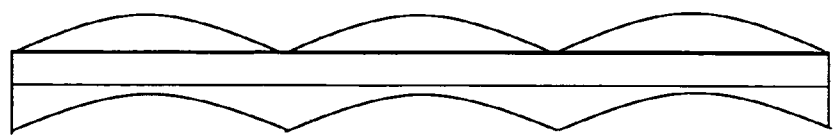
FIGS. 11A–11D illustrate several lenticular arrays in accordance with exemplary embodiments.
Figure 11B:
Figure 11C:
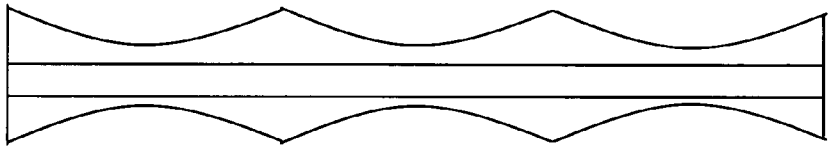
Figure 11D:
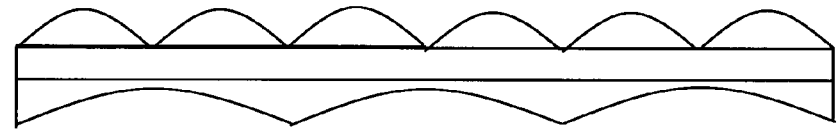

The formation of lenticular arrays in accordance with at least one exemplary embodiment is shown in FIGS. 10A–10D. Examples of processes for making micro-optical elements from gray scale etched master molds are discussed in copending U.S. patent application Ser. No. 10/285,578, filed 1 Nov. 2002, "PROCESS FOR MAKING MICRO-OPTICAL ELEMENTS FROM GRAY SCALE ETCHED MASTER MOLD." At least one exemplary embodiment uses a lenticular array to serve as or form a master mold. The master mold can be used to form secondary molds or used to stamp or mold an optical material to form lenticular arrays in accordance with the exemplary embodiments discussed herein. FIGS. 10A–10D illustrate a stamping process in accordance with at least one exemplary embodiment. FIG. 10A illustrates a lenticular array 1000 in accordance with at least one exemplary embodiment discussed herein. Several layers 1010 and 1020 can be added to the lenticular array 1000 (FIG. 10B). The layers 1010 and 1020 can be cured or solidified to form a master sold 1030 (FIG. 10C). The master mold can be stamped into an optical material 1040 (FIG. 10C) to form a copy lenticular array 1050 (FIG. 10D), which can then be cured (e.g. chemical curing, cooling, UV treatment, and the like). Although discussion above with reference to FIGS. 10A–10D illustrates one exemplary embodiment of formation of a lenticular array in accordance with at least one exemplary embodiment, the discussion herein is not intended to limit the molding or stamping to the example illustrated in FIGS. 10A–10D. One of ordinary art would be able to develop or use other molding methods to construct lenticular arrays in accordance with exemplary embodiments.

The discussion herein has utilized Figures to illustrate examples of some but not all of the exemplary embodiments. FIGS. 11A–11D illustrate further examples of lenticular arrays in accordance with at least one exemplary embodiment. The lenticular array can have a variety of shapes and sizes.

The detail discussion above has discussed several exemplary embodiments. These embodiments should not be interpreted to be limitative of the scope. Many substitutions and uses are envisioned and are intended to lie within the scope of the invention. For example the term lenticular array can refer to various arrangements of lens structures (e.g. cylindrical lenses, micro lenses, non-symmetric lenses, symmetric lenses, and the like). Likewise there is no limit to the material that can be used to form the lenslets, (e.g. glass, Si, SiC, SiN, SiO, InP, GaAs, GaN, SiON, Ni, Cr, NiCr, Ti, Al, W, Pt and the like). Likewise, the formation process of lenticular arrays in accordance with exemplary embodiments, can be by a variety of methods (e.g. reflow, RIE, DRIE, ECR, Wet Etching, laser etching methods, plasma etching, molding, stamping, and the like).

Likewise various types of displays can utilize lenslet arrays in accordance with exemplary embodiments, such as projection displays, electroluminescent (EL) displays, field emission displays (FED), vacuum fluorescent (VF) displays, liquid crystal (LC) displays, organic light emitting diode (OLED) displays, high temperature poly-silicon (HTPS) and low temperature poly-silicon (LTPS) displays, LED displays, and other like systems and methods described in copending application entitled "AN AUTOSTEREOSCOPIC DISPLAY AND METHOD OF DISPLAYING MULTIDIMENSIONAL IMAGES ESPECIALLY COLOR IMAGES" by Rodney L. Clark, Daniel M. Brown, and Peter Erbach, filed in the U.S. Patent and Trademark Office on Jan. 27, 2000 (application Ser. No. 09/492,315), the contents of which are incorporated in its entirety.

The description of the invention is merely exemplary in nature and, thus, variations that do not depart from the gist of the invention are intended to be within the scope of the embodiments of the present invention. Such variations are not to be regarded as a departure from the spirit and scope of the present invention.

What is claimed is:

1. An autostereoscopic array, comprising:
   a lenticular array, the lenticular array having at least one lenslet, each lenslet being of independent shape and size, where each lenslet has at least a first and a second axis, where the first axis is parallel to a line corresponding to a center of curvature of a face of the lenslet, and the second axis bisects a projection of the lenslet, where vectors corresponding to each axis intersect at a non-zero first angle and the lenslets have at least one radius of curvature measured from the center of curvature, where the lenticular array, if positioned before a pixel array having subpixel elements with gaps between the subpixels, will blur an image of the gaps by choosing a rotation angle corresponding to a projection of the first angle, where the lenslets have varying shape and size, redirecting light from the subpixels creating several views.

2. The autostereoscopic array of claim 1, where at least one lenslet is spherically symmetric.

3. The autostereoscopic array of claim 1, where at least one lenslet is cylindrical symmetric.

4. The autostereoscopic array of claim 3, where the at least one lenslet is cylindrically convex.

5. The autostereoscopic array of claim 3, where the at least one lenslet is cylindrically concave.

6. The autostereoscopic array of claim 1, where the extent of at least one lenslet covers a portion of a pixel and a second lenslet covers the remaining portion of the pixel.

7. The autostereoscopic array of claim 1, where a tilt angle is chosen instead of the rotation angle to blur an image of the gaps of non-illumination, where the tilt angle is a rotation of a lenslet into or out of the plane of the lenticular array, where the reference surface is defined by at least one of the intersection of the centers of the lenslets and the intersection of tangents of the first axis of lenslets.

8. The autostereoscopic array of claim 7, where the reference surface is curved in shape.

9. The autostereoscopic array of claim 7, where the reference surface is a flat plane.

10. The autostereoscopic array of claim 1 having at least a first and second lenslet, wherein the first axis of the first lenslet and the first axis of the second lenslet are offset a chosen offset distance.

11. The autostereoscopic array of claim 1 having at least a first and second lenslet, wherein the second axis of the first lenslet and the second axis of the second lenslet are offset a chosen offset distance.

12. The autostereoscopic array of claim 1 having at least a first and second lenslet, wherein a first vector corresponding to the second axis-of the first lenslet and a second vector corresponding to the second axis of the second lenslet intersect at a non-zero angle.

13. The autostereoscopic array of claim 1, wherein the first angle is variable.

14. The autostereoscopic array of claim 1, wherein the radius of curvature is variable.

15. An autostereoscopic array comprising:
a lenticular array, the lenticular array having at least one lenslet, each lenslet being of independent shape and size, where each lenslet has at least a first and a second axis, where the first axis is parallel to a line corresponding to a center of curvature of a face of the lenslet, and the second axis bisects a projection of the lenslet, where vectors corresponding to each axis intersect at a non-zero first angle and the lenslets have at least one radius of curvature measured from the center of curvature, where the lenticular array, if positioned before a pixel array having subpixel elements with pans between the subpixels, will blur an image of the gaps by choosing a rotation angle corresponding to a projection of the first angle,
said autostereoscopic array having at least a first and second lenslet, wherein a first vector corresponding to the first axis of the first lenslet and a second vector corresponding to the first axis of the second lenslet intersect at a non-zero second angle.

16. A method of autostereoscopic displaying a 3-D image comprising:
placing a lenticular array before a pixel array, the pixel array transmitting light, where the pixel array has at least one pixel, where the pixel has subpixels, and where the subpixels have gaps between the subpixels;
generating N individual perspective views using N groups of pixels in the pixel array; and
passing the light from the pixel array through the lenticular array, where the individual perspective views combine to form a 3-D autostereoscopic image, the lenticular array composed of lenslets, each lenslet being of independent shape and size, each lenslet having at least a first and a second axis, where the first axis is parallel to a line corresponding to a center of curvature of a face of the lenslet, and the second axis bisects a projection of the lenslet, where vectors corresponding to each axis intersect at a non-zero first angle, the lenslet having a radius of curvature, where the lenticular array blurs an image of the gaps by choosing the first angle, where the lenslets have varying shape and size, redirecting light from the subpixels creating several views.

17. The method claim 16, where choosing a radius of curvature blurs the image of the gaps.

18. The method of claim 16, where the pixel array is part of an electronic display.

* * * * *